United States Patent
Puskarich

(10) Patent No.: US 10,459,521 B2
(45) Date of Patent: *Oct. 29, 2019

(54) TOUCH SURFACE FOR SIMULATING MATERIALS

(71) Applicant: Apple Inc., Cupertino, CA (US)

(72) Inventor: Paul G. Puskarich, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/091,501

(22) Filed: Apr. 5, 2016

(65) Prior Publication Data

US 2016/0216766 A1 Jul. 28, 2016

Related U.S. Application Data

(63) Continuation of application No. 14/059,693, filed on Oct. 22, 2013, now Pat. No. 9,317,118.

(51) Int. Cl.
   *G06F 3/01* (2006.01)
   *G06F 3/0354* (2013.01)
   (Continued)

(52) U.S. Cl.
   CPC .......... *G06F 3/016* (2013.01); *G06F 3/03547* (2013.01); *G06F 3/044* (2013.01); *G06F 3/0416* (2013.01)

(58) Field of Classification Search
   CPC ..................................................... G06F 3/016
   See application file for complete search history.

(56) References Cited

U.S. PATENT DOCUMENTS

| 3,001,049 A | 9/1961 | Didier |
| 3,390,287 A | 6/1968 | Sonderegger |

(Continued)

FOREIGN PATENT DOCUMENTS

| AU | 2015100710 | 7/2015 |
| AU | 2016100399 | 5/2016 |
| CA | 2355434 | 2/2002 |
| CN | 1324030 | 11/2001 |

(Continued)

OTHER PUBLICATIONS

Electromagnetic spectrum downloaded from http://imagine.gsfc.nasa.gov/science/toolbox/emspectrum1.html on Jun. 6, 2016, pp. 1-4.*

(Continued)

*Primary Examiner* — Dorothy Harris
(74) *Attorney, Agent, or Firm* — Brownstein Hyatt Farber Schreck, LLP

(57) ABSTRACT

A system for simulating materials using touch surfaces includes a touch surface, an actuator and/or an temperature control device, and a control unit. The control unit controls the actuator or the temperature control device to cause at least a portion of the touch surface to simulate a material. Such control may include utilizing the actuator to vibrate the surface to simulate the tactile sensation of texture. Such control may also include utilizing the temperature control device (such as a Peltier device) to control the temperature of the surface in order to simulate the thermal conductivity of a material. In some cases, the temperature control may be performed utilizing a temperature sensor to adjust the temperature of the surface. In various cases, the vibration and/or temperature may be varied over time, such as in response to one or more touches detected using one or more touch sensors.

20 Claims, 5 Drawing Sheets

(51) Int. Cl.
*G06F 3/041* (2006.01)
*G06F 3/044* (2006.01)

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A * | 11/1994 | Ohya .............. H01L 41/083 310/328 |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |

(56) References Cited

U.S. PATENT DOCUMENTS

| | | |
|---|---|---|
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Berta et al. |
| 8,179,202 B2 | 5/2012 | Cruz-Hernandez et al. |
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2* | 4/2013 | Wong .................. G06F 3/011 178/18.01 |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,717,309 B2 | 5/2014 | Almalki |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,117,347 B2 | 8/2015 | Matthews |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,411,423 B2 | 8/2016 | Heubel |
| 9,417,695 B2 | 8/2016 | Griffin et al. |
| 9,430,042 B2 | 8/2016 | Levin |
| 9,449,476 B2* | 9/2016 | Lynn .................. G08B 6/00 |
| 9,452,268 B2 | 9/2016 | Badaye et al. |
| 9,477,342 B2 | 10/2016 | Daverman et al. |
| 9,501,912 B1 | 11/2016 | Hayskjold et al. |
| 9,542,028 B2 | 1/2017 | Filiz et al. |
| 9,544,694 B2 | 1/2017 | Abe et al. |
| 9,576,445 B2 | 2/2017 | Cruz-Hernandez |
| 9,622,214 B2 | 4/2017 | Ryu |
| 9,659,482 B2 | 5/2017 | Yang et al. |
| 9,594,450 B2 | 7/2017 | Lynn et al. |
| 9,727,157 B2 | 8/2017 | Ham et al. |
| 9,778,743 B2 | 10/2017 | Grant et al. |
| 9,779,592 B1 | 10/2017 | Hoen |
| 9,823,833 B2 | 11/2017 | Grant et al. |
| 9,904,393 B2 | 2/2018 | Frey et al. |

(56) References Cited

U.S. PATENT DOCUMENTS

| | | |
|---|---|---|
| 9,934,661 B2 | 4/2018 | Hill |
| 9,990,099 B2 | 6/2018 | Ham et al. |
| 10,038,361 B2 | 7/2018 | Hajati et al. |
| 10,067,585 B2 | 9/2018 | Kim |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,198,097 B2 | 2/2019 | Lynn et al. |
| 2002/0169924 A1* | 11/2002 | Osborn ............... G06F 1/206 711/106 |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0178764 A1* | 8/2006 | Bieswanger ........... G06F 1/206 700/89 |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1* | 1/2009 | Ullrich ............... G06F 3/016 345/173 |
| 2009/0043531 A1 | 2/2009 | Kahn et al. |
| 2009/0115734 A1 | 5/2009 | Fredriksson et al. |
| 2009/0120105 A1* | 5/2009 | Ramsay ............... G06F 3/016 62/3.3 |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0291670 A1 | 11/2009 | Sennett et al. |
| 2009/0299543 A1* | 12/2009 | Cox ................... G06F 1/203 700/299 |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1* | 4/2010 | Hoellwarth ............ G06F 3/016 340/407.2 |
| 2010/0089735 A1 | 4/2010 | Takeda et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0156818 A1* | 6/2010 | Burrough ............ G06F 3/016 345/173 |
| 2010/0156843 A1* | 6/2010 | Paleczny ............ G06F 3/016 345/174 |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0210313 A1* | 8/2010 | Huang ............... H04M 19/041 455/567 |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0267424 A1* | 10/2010 | Kim ................... G06F 3/016 455/566 |
| 2010/0309141 A1 | 12/2010 | Cruz-Hernandez et al. |
| 2010/0328229 A1 | 12/2010 | Weber et al. |
| 2011/0007023 A1 | 1/2011 | Abrahamsson et al. |
| 2011/0043454 A1* | 2/2011 | Modarres ............ B06B 1/0629 345/173 |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0157052 A1 | 6/2011 | Lee et al. |
| 2011/0163985 A1 | 7/2011 | Bae et al. |
| 2011/0193824 A1* | 8/2011 | Modarres ............ G06F 3/041 345/177 |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0028577 A1* | 2/2012 | Rodriguez ......... H04N 21/44008 455/41.1 |
| 2012/0050172 A1* | 3/2012 | Wong ................... G06F 3/011 345/173 |
| 2012/0068957 A1* | 3/2012 | Puskarich ............ G06F 3/016 345/174 |
| 2012/0075198 A1 | 3/2012 | Sulem et al. |
| 2012/0092263 A1 | 4/2012 | Peterson et al. |
| 2012/0126959 A1* | 5/2012 | Zarrabi ............... B06B 1/0688 340/407.1 |
| 2012/0127088 A1 | 5/2012 | Pance et al. |
| 2012/0133494 A1* | 5/2012 | Cruz-Hernandez ..... G06F 3/016 340/407.2 |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |
| 2012/0268412 A1* | 10/2012 | Cruz-Hernandez ......... G06F 3/0488 345/174 |
| 2012/0274578 A1 | 11/2012 | Snow et al. |
| 2012/0280927 A1 | 11/2012 | Ludwig |
| 2012/0286847 A1* | 11/2012 | Peshkin ............ G06F 3/016 327/517 |
| 2012/0319987 A1 | 12/2012 | Woo |
| 2012/0327006 A1 | 12/2012 | Israr et al. |
| 2013/0027345 A1* | 1/2013 | Binzel ............... G06F 3/044 345/174 |
| 2013/0033967 A1 | 2/2013 | Chuang et al. |
| 2013/0058816 A1 | 3/2013 | Kim |
| 2013/0063285 A1 | 3/2013 | Elias |
| 2013/0063356 A1 | 3/2013 | Martisauskas |
| 2013/0106699 A1 | 5/2013 | Babatunde |
| 2013/0120290 A1* | 5/2013 | Yumiki ............ G06F 3/041 345/173 |
| 2013/0154814 A1* | 6/2013 | Pance ................ G06F 3/016 340/407.2 |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1* | 8/2013 | Hilbert ............... A63F 13/00 463/31 |
| 2013/0222280 A1* | 8/2013 | Sheynblat .......... G06F 3/016 345/173 |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |

(56) References Cited

U.S. PATENT DOCUMENTS

| | | | |
|---|---|---|---|
| 2014/0082490 A1 | 3/2014 | Jung et al. |
| 2014/0085065 A1 | 3/2014 | Biggs et al. |
| 2014/0143785 A1 | 5/2014 | Mistry et al. |
| 2014/0168153 A1 | 6/2014 | Deichmann et al. |
| 2014/0197936 A1 | 7/2014 | Biggs et al. |
| 2014/0232534 A1 | 8/2014 | Birnbaum et al. |
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2014/0320436 A1* | 10/2014 | Modarres ............... G06F 3/0412 345/173 |
| 2015/0005039 A1 | 1/2015 | Liu et al. |
| 2015/0040005 A1 | 2/2015 | Faaborg |
| 2015/0090572 A1 | 4/2015 | Lee et al. |
| 2015/0098309 A1 | 4/2015 | Adams et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1* | 8/2015 | Wang ....................... G06F 3/16 345/173 |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0103544 A1 | 4/2016 | Filiz et al. |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216764 A1 | 7/2016 | Morrell et al. |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0070131 A1 | 3/2017 | Degner et al. |
| 2017/0090667 A1 | 3/2017 | Abdollahian et al. |
| 2017/0192508 A1 | 7/2017 | Lim et al. |
| 2017/0242541 A1 | 8/2017 | Iuchi et al. |
| 2017/0255295 A1 | 9/2017 | Tanemura et al. |
| 2017/0257844 A1 | 9/2017 | Miller et al. |
| 2017/0285747 A1 | 10/2017 | Chen |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0060941 A1 | 3/2018 | Yang et al. |
| 2018/0075715 A1 | 3/2018 | Morrell et al. |
| 2018/0081441 A1 | 3/2018 | Pedder et al. |
| 2018/0174409 A1 | 6/2018 | Hill |
| 2018/0203513 A1 | 7/2018 | Rihn |
| 2018/0302881 A1 | 10/2018 | Miller et al. |
| 2019/0159170 A1 | 5/2019 | Miller et al. |
| 2019/0214895 A1 | 7/2019 | Moussette et al. |

FOREIGN PATENT DOCUMENTS

| | | |
|---|---|---|
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2014002729 | 1/2014 |
| JP | 2014509028 | 4/2014 |
| JP | 2014235133 | 12/2014 |
| JP | 2014239323 | 12/2014 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 00/051190 | 8/2000 |
| WO | WO 01/059588 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |

(56) References Cited

FOREIGN PATENT DOCUMENTS

| WO | WO 09/122331 | 10/2009 |
|---|---|---|
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 13/169299 | 11/2014 |
| WO | WO 15/023670 | 2/2015 |

OTHER PUBLICATIONS

Actuator definition downloaded from http://www.thefreedictionary.com/actuator on May 3, 2018, 2 pages.*

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

U.S. Appl. No. 15/364,822, filed Nov. 30, 2016, Chen.
U.S. Appl. No. 15/251,459, filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.
U.S. Appl. No. 15/641,192, filed Jul. 3, 2017, Miller et al.

Nakamura, "A Torso Haptic Display Based on Shape Memory Alloy Actuators," Massachusetts Institute of Technology, 2003, pp. 1-123.

U.S. Appl. No. 15/800,630, filed Nov. 1, 2017, Morrell et al.

* cited by examiner

TOUCH SURFACE FOR SIMULATING MATERIALS

CROSS-REFERENCE TO RELATED APPLICATION

This application is a continuation of U.S. patent application Ser. No. 14/059,693, filed Oct. 22, 2013, and entitled "Touch Surface for Simulating Materials," the contents of which are incorporated herein by reference as if fully enclosed herein.

TECHNICAL FIELD

This disclosure relates generally to touch surfaces, and more specifically to a touch surface for simulating materials.

BACKGROUND

Electronic devices may have touch devices that include touch surfaces for receiving input from, and/or providing output to, one or more users. Such touch devices may include touch screens, track pads, button elements, and/or other such touch devices. In some cases, the touch devices may be able to detect a touch (such as the touch of a user's body part, a stylus, and/or other such touch) and interpret that touch as input. Such touch detection may include detection that a touch has occurred, the location of the touch, the force of the touch, the duration of the touch, movement across the touch surface associated with the touch, and/or any other such characteristics of the touch. In various cases, the touch device may be able to provide output, such as haptic feedback and/or output.

Typically, touch surfaces are smooth surfaces constructed of various plastics, metals, or glass. The tactile characteristics of such touch surfaces may be limited by the physical characteristics of the materials utilized to construct the surfaces.

SUMMARY

The present disclosure discloses systems and methods for simulating materials using touch surfaces. In one or more embodiments, a system for simulating materials using touch surfaces may include at least one touch surface, at least one actuator or at least one temperature control device, and at least one control unit. The control unit may control the actuator or the temperature control device to cause at least a portion of the touch surface to simulate a material.

Such control may include utilizing the actuator to vibrate at least a portion of the touch surface. Such vibrations may simulate the tactile sensation of texture. In some cases, the vibrations may be varied over time, such as in response to one or more touches detected using one or more touch sensors.

Such control may also include utilizing the temperature control device (such as a Peltier device) to control the temperature of at least a portion of the touch surface in order to simulate the tactile sensation of the thermal conductivity of a material. In some cases, the temperature control may be performed utilizing data from one or more temperature sensors to adjust the temperature of the touch surface. In some cases, the temperature may be varied over time, such as in response to one or more touches detected using one or more touch sensors.

In various implementations, the entire touch surface may be caused to simulate the material. However, in other implementations, the touch surface may include a plurality of regions that are each controllable. In some cases, each of the plurality of regions may include one or more actuators, temperature control devices, touch sensors, and/or temperature sensors. Further, in various cases, each of the plurality of regions may be simultaneously controllable to simulate different materials than one or more of the other regions.

In some implementations, the touch surface may include a layer of diamond material. The diamond material may be a layer of chemical vapor deposited diamond, such as a layer of carbon vapor deposited diamond. Such a layer of diamond may provide extremely high thermal conductivity, extreme mechanical hardness, and/or optical broadband optical transparency.

In some embodiments, a method for simulating materials using a touch surface may include determining at least one material to simulate using a touch surface and controlling at least one of at least one actuator or at least one temperature control device to case the at least one touch surface to simulate at least one material.

In various embodiments, a touch device may include at least one touch surface, at least one actuator or at least one temperature control device, and at least one control unit. The control unit may control the actuator or the temperature control device to cause at least a portion of the touch surface to simulate a material.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
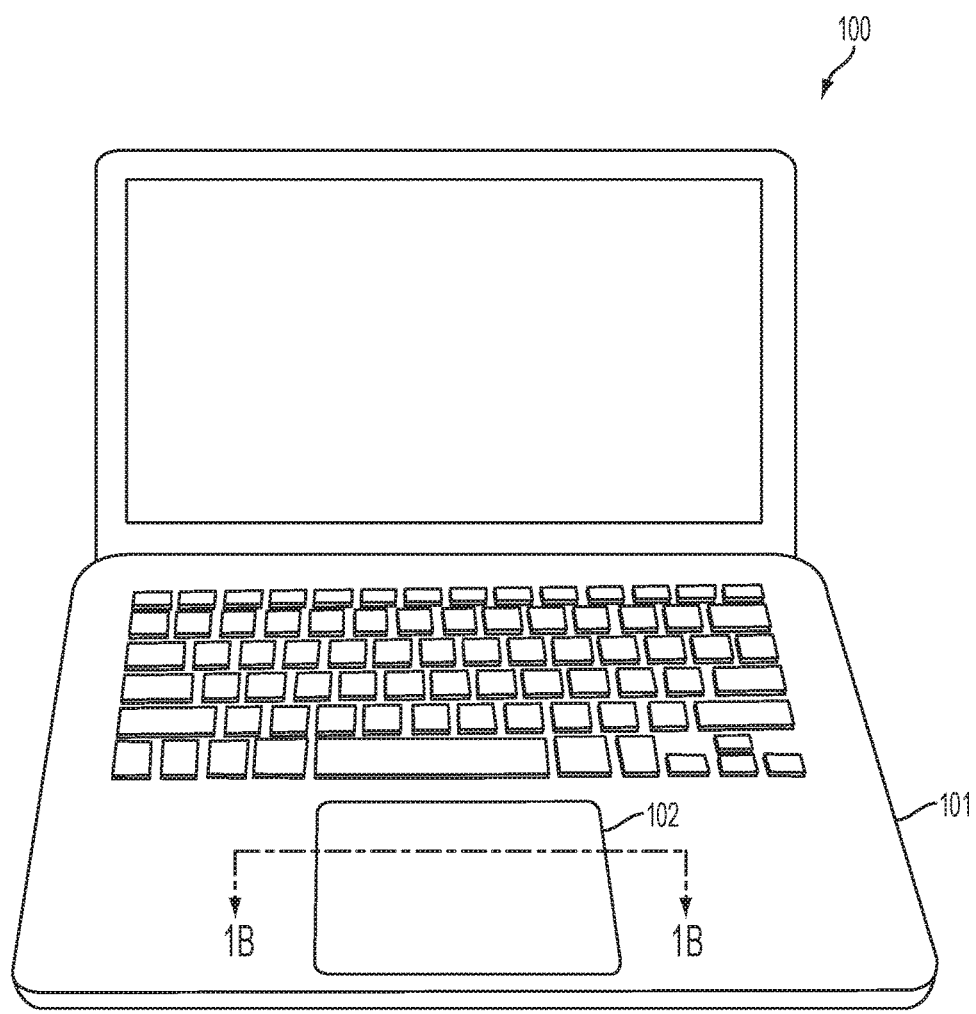
FIG. 1A is a isometric view of an example system for simulating materials using touch surfaces.

The description that follows includes sample systems, methods, and computer program products that embody various elements of the present disclosure. However, it should be understood that the described disclosure may be practiced in a variety of forms in addition to those described herein.

The present disclosure discloses systems and methods for simulating materials using touch surfaces. A touch device may include at least one touch surface, at least one actuator or at least one temperature control device, and at least one control unit. The control unit may control the actuator or the temperature control device to cause at least a portion of the touch surface to simulate a material.

Such control may include utilizing the actuator to move vertically and/or horizontally to vibrate at least a portion of the touch surface. Such vibrations may simulate the tactile sensation of texture. Rougher surfaces may be simulated by producing stronger vibrations than those produces to simulate smoother surfaces. Simulation of a material as smooth as the touch surface itself may include not utilizing the actuator to produce vibrations.

In some cases, the vibrations may be varied over time, such as in response to one or more touches detected using one or more touch sensors (such as position sensors, force sensors, capacitive sensors, and/or other sensors capable of detecting one or more characteristics of a touch). For example, the vibrations may be varied over time in response to detection of a touch moving across the touch surface in order to simulate the grain of a wood surface.

Such control may also include utilizing the temperature control device to control the temperature of at least a portion of the touch surface. Such a temperature control device may include at least one Peltier device. The temperature control may simulate the tactile sensation of the thermal conductivity of a material. For example, a glass surface may be controlled to have the temperature of a relatively cooler metal material and/or a relatively warmer wood material. In some cases, the temperature control may be performed utilizing data from one or more temperature sensors that detect a temperature of the touch surface. In such cases, the temperature control device may be adjusted based on the data to adjust the temperature of the touch surface.

In some cases, the temperature may be varied over time, such as in response to one or more touches detected using one or more touch sensors. For example, a metal material may increase in temperature while touched in response to heat from a user's finger. To simulate such a metal material, the temperature of a touch surface may varied over time to increase when a user touch is maintained.

In various implementations, the actuator(s) and/or temperature control device(s) may be controlled to cause the entire touch surface to simulate the material. However, in other implementations, the touch surface may include a plurality of regions that are each controllable to simulate one or more materials. In some cases, each of the plurality of regions may include one or more actuators, temperature control devices, touch sensors, and/or temperature sensors. Further, in various cases, each of the plurality of regions may be simultaneously controllable to simulate different materials than one or more of the other regions.

In some implementations, the touch surface may include a layer of diamond material. The diamond material may be a layer of chemical vapor deposited diamond, such as a layer of carbon vapor deposited diamond. Such a layer of diamond may provide extremely high thermal conductivity (which may exceed that of copper by approximately a factor of five), extreme mechanical hardness (providing exceptional wear resistance), and/or optical broadband optical transparency (being transparent from approximately ultraviolet to far infrared).

FIG. 1A is a isometric view of an example system 100 for simulating materials using touch surfaces. The system may include an electronic device 101 and a touch device 102. The touch device may be formed from a variety of different materials such as one or more metals, plastic, glass, and/or any other such suitable material.

As illustrated, the electronic device 101 is a laptop computing device. However, it is understood that this is an example. In various implementations, the electronic device may be any electronic device that includes a touch device 102 and/or any touch surface without departing from the scope of the present disclosure. For example, such an electronic device may be a desktop computing device, a mobile computing device, a tablet computing device, a laptop computing device, a digital media player, a kitchen appliance, a display device, a cellular phone, a smart phone, a wearable device, an automobile, and/or any other kind of electronic device.

Further, as illustrated, the touch device 102 is a touch pad. However, it is understood that this is an example. In various implementations, the touch device may be any kind of touch surface without departing from the scope of the present disclosure. For example, the touch device may be a track pad, a touch screen, a button element, and/or any other kind of touch surface.

Figure 1B:
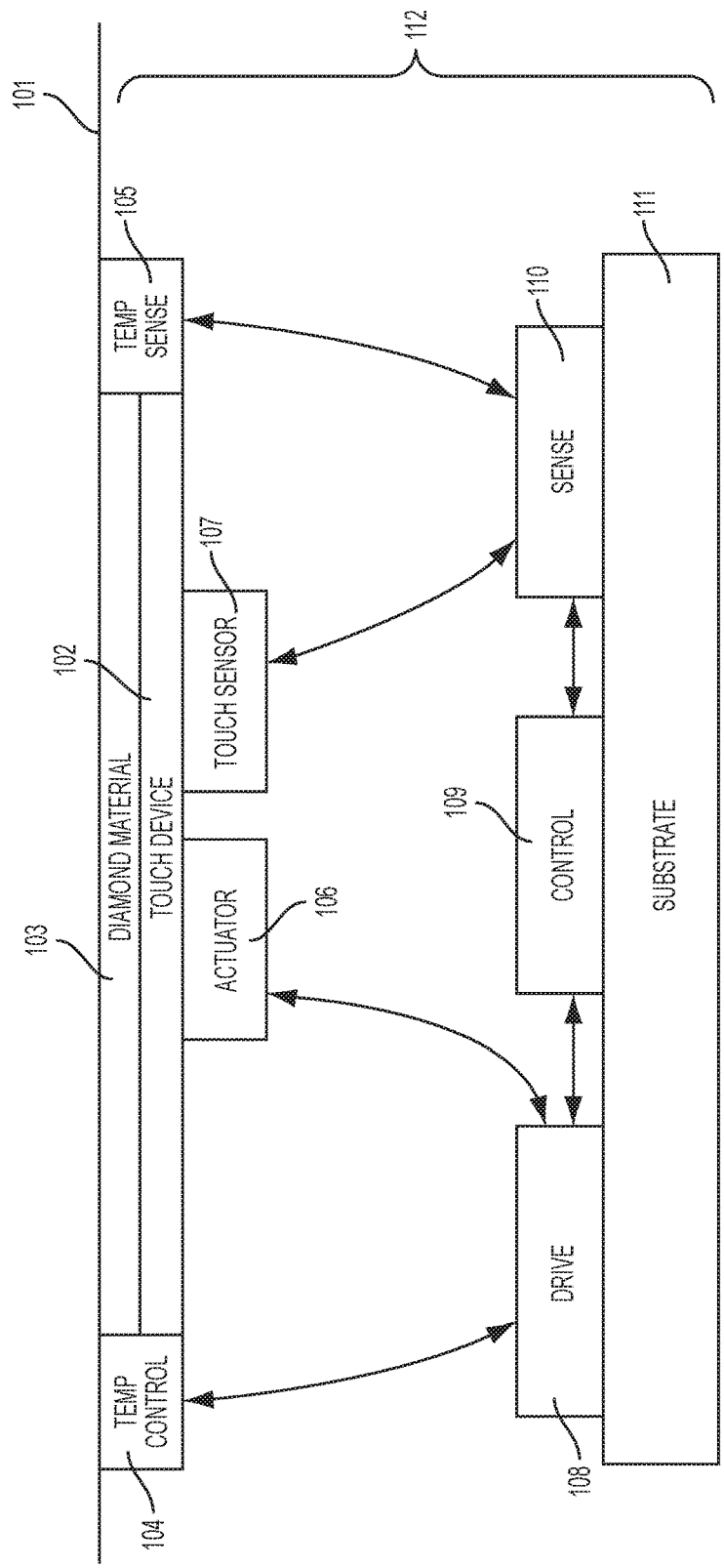
FIG. 1B is a front cross-sectional view of the example system of FIG. 1 taken along line 1B in FIG. 1.

FIG. 1B is a front cross-sectional view of the example system 100 of FIG. 1 taken along line 1B in FIG. 1. As illustrated, the touch device 102 may be part of a touch device system 112. The touch device system may include one or more temperature control devices 104 (such as one or more Peltier devices), temperature sensors 105, actuators 106 (such as one or more electromechanical actuators), touch sensors 107 (such as one or more position sensors, force sensors, capacitive sensors, and/or other sensors capable of detecting one or more characteristics of a touch), drive circuits 108, control units 109 (such as one or more processing units), sensing circuits 110, and/or substrates 111 (such as one or more printed circuit boards).

The control unit 109, drive circuit 108, and sensing circuit 110 may be mounted to the substrate 111. The drive circuit may be communicably coupled to the actuator 106 and/or the temperature control device 104 and the sensing circuit may be coupled to the touch sensor 107 and/or the temperature sensor 105. The control unit may be communicably coupled to the drive circuit and/or the sensing circuit in order to receive data from the touch sensor and/or the temperature sensor and/or control the actuator and/or the temperature control device in order to simulate one or more materials.

The actuator 106 may be operable to move (such as horizontally or vertically) in order provide one or more vibrations via the touch device 102. Such vibrations may be provided as haptic output and/or feedback. Such vibrations may also be provided to simulate the tactile sensation of the texture of a material. The actuator may vibrate all of the touch device or just one or more portions of the touch device.

For example, the control unit 109 may cause the actuator 106 to vibrate in order to simulate a rougher material (such as wood) than the material from the touch device 102 is actually made (such as plastic). The control unit may cause the actuator to vibrate more to simulate rougher materials and less to simulate smoother materials. When simulating a material as smooth or smoother than the materials from which the touch device is actually made, the control unit may not cause the actuator to vibrate.

The control unit 109 may vary the vibrations that the actuator 106 is caused to provide over time. In some cases, the vibrations may be varied based on one or more touches detected by the touch sensor 107. For example, the control unit may increase the vibrations provided by the actuator in response to the touch sensor detecting that a user's finger is moving across the touch device 102 in order to simulate the grain of a wood material. By way of another example, the control unit may increase the vibrations provided by the actuator in response to the touch sensor detecting that a user's finger is pressing with increase force on the touch device 102 in order to simulate the application of increased force to the texture of the material.

The temperature control device 104 may be operable to control the temperature (such as by increasing, decreasing, and/or maintaining the temperature) of the touch device 102. This control may be accomplished by heating, cooling, sinking heat, dissipating or diffusing heat, activating fans or other cooling mechanisms, and so on. Such temperature control may simulate the tactile sensation of the thermal conductivity of a material. The temperature control device may control the temperature of all of the touch device or just one or more portions of the touch device.

For example, the control unit 109 may cause the temperature control device 104 to decrease the temperature of the touch device 102 in order to simulate a relatively cooler material (such as metal) than the material from the touch device is actually made (such as glass). By way of another example, the control unit may cause the temperature control device to increase the temperature of the touch device in order to simulate a relatively warmer material (such as wood) than the material from the touch device is actually made (such as metal).

The control unit 109 may vary the temperature that the temperature control device 104 is caused to control over time. In some cases, the temperature may be varied based on one or more touches detected by the touch sensor 107. For example, the control unit may increase the temperature of a particular portion of the touch device 102 in response to the touch sensor detecting that a user's finger is touching that portion for an extended period of time in order to simulate the warming of a metal material in response to sustained exposure to heat from the user's finger.

Figure 1C:
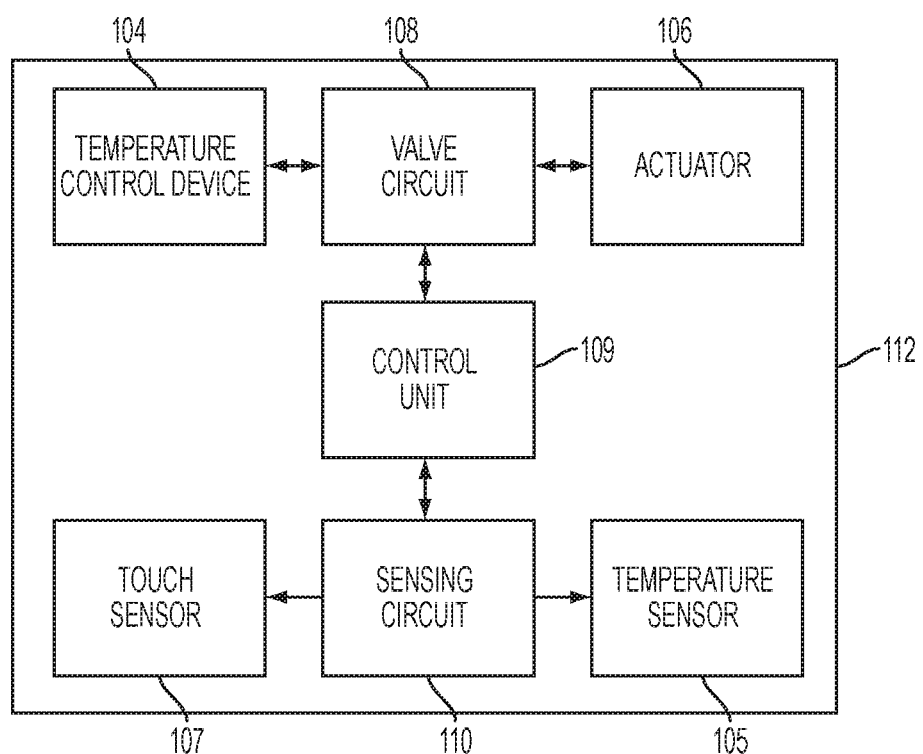
FIG. 1C is a block diagram illustrating an example functional relationship of the components of the touch device system of the example system of FIG. 1B.

FIG. 1C is a block diagram illustrating an example functional relationship of the components of touch device system 112 of the example system 100 of FIG. 1B. As illustrated, the control unit 109 may be communicably coupled to the drive circuit 108 and/or the sensing circuit 110, the drive circuit may be communicably coupled to the temperature control device 104 and/or the actuator 106, and/or the sensing circuit may be communicably coupled to the touch sensor 107 and/or the temperature sensor 105.

In some implementations, the touch device system 112 may include additional components not shown. For example, in some implementations, the touch device system may include one or more non-transitory storage media (not shown), which may take the form of, but is not limited to, a magnetic storage medium; optical storage medium; magneto-optical storage medium; read only memory; random access memory; erasable programmable memory; flash memory; and so on. Such a non-transitory storage medium may include one or more settings (such as user defined settings, default settings, system configuration settings, and so on) which specify one or more materials to simulate, how to determine which material to simulate, conditions to evaluate regarding when and which material to simulate, specifications as to how to simulate a particular material, and so on.

Although the actuator 106 and the temperature control device 104 are shown and described as separate components, it is understood that this is an example. In various implementations, these components may be separate components, portions of the same component (such as a piezoelectric actuator that also produces heat along with changing shape in response to electrical charge), combined components (such as temperature control devices laminated or otherwise attached to the top of actuators), and so on.

Further, in some cases, use of the actuator 106 may produce undesirable heat. For example, an actuator that produces heat during operation may cause the temperature of a touch surface to be warmer than the temperature of a cement surface in order to produce sufficient vibration to simulate the texture of the cement. To ameliorate this heating, the touch surface may be cooled (or heat sunk or otherwise heat dissipated or diffused) by one or more temperature cooling devices in order to prevent the simulation of texture from causing the touch surface to have temperature properties even less like the simulated material than it would normally.

Figure 2:
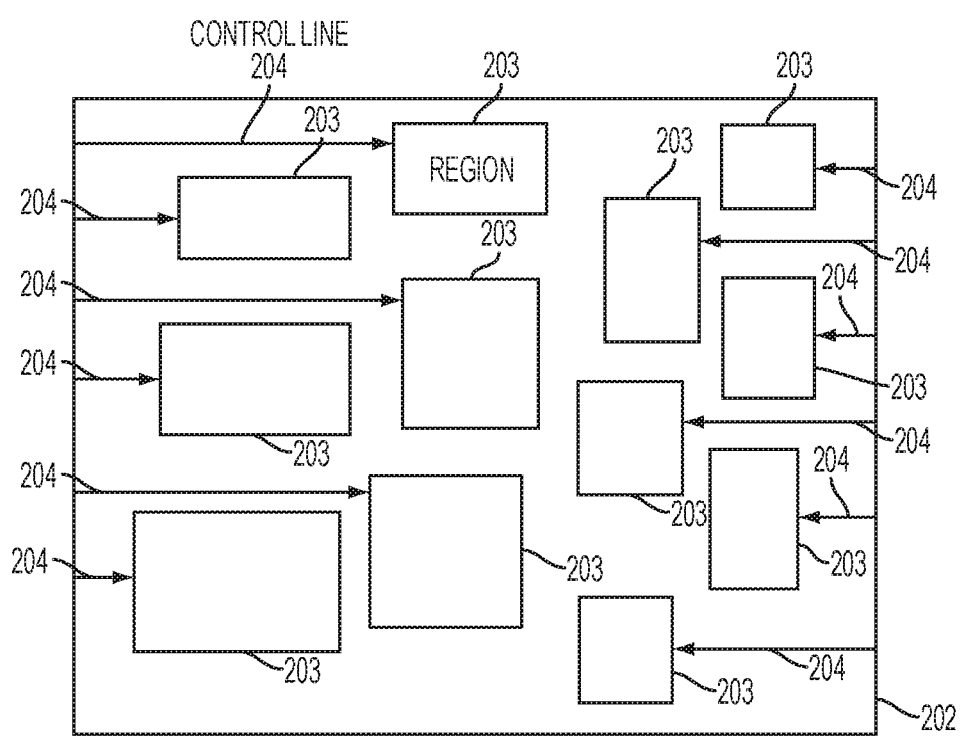
FIG. 2 is a bottom view of an alternative embodiment of a portion of the example system of FIG. 1A.

In various implementations, the actuator(s) and/or temperature control device(s) may be controlled to cause the entire touch surface to simulate the material. However, in other implementations, the touch surface may include a plurality of regions that are each controllable to simulate one or more materials. For example, FIG. 2 is a bottom view of an alternative embodiment of a portion of the example system 100 of FIG. 1. As illustrated, in this embodiment the touch device 202 includes a plurality of regions 203 that are connected to one or more control lines 204.

In some cases, the control lines 204 may connect to the temperature control device 104 and may be operable to control the temperature of the regions 203 under the direction of the temperature control device. In other cases, the regions may each include an actuator 106 and the control lines may connect the actuators to the drive circuit 108 in order to control the respective actuator for a particular region.

In still other cases, the regions 203 may each include one or more temperature control devices 104, temperature sensors 105, actuators 106, and/or touch sensors 107. As such, the control lines 204 may connect to one or more of the drive circuit 108 and/or the sensing circuit 110 such that the control unit 109 is able to independently control vibration and/or temperature of each of the regions.

In various cases, a touch surface such as plastic may have multiple regions that are individually controllable and may include individually controllable actuators and/or temperature control devices. For example, such regions may be individually controllable such that one region is controlled to simulate the rougher texture of wood and heated to simulate the relatively warmer temperature of wood while another region is controlled to simulate the smoother texture of metal and cooled (or heat sunk or otherwise heat dissipated or diffused) to simulate the relatively cooler temperature of metal. In this way, a single touch surface may be utilized to simulate multiple different materials simultaneously.

By way of another example, such regions may be individually controllable to simulate more complex behaviors of a material. The temperature of a touched portion of a glass touch surface may be increased to simulate a metal material increasing in temperature in response to the heat of the touch. However, due to the temperature properties of the glass touch surface, the temperature from the heating may diffuse to surrounding areas causing the surrounding areas to have a higher temperature than if the surface was actually metal. As such, in addition to heating the portion corresponding to the touch, the surrounding portions may be cooled (or heat sunk or otherwise heat dissipated or diffused) such that the temperature of the surrounding portions more closely simulates the diffusion of heat from the touch in metal.

Returning to FIG. 1B, in some implementations, the touch surface may include a layer of diamond material 103. The diamond material may be a layer of chemical vapor deposited diamond, such as a layer of carbon vapor deposited diamond. Such a layer of diamond may provide extremely high thermal conductivity (which may exceed that of copper by approximately a factor of five), extreme mechanical hardness (providing exceptional wear resistance), and/or optical broadband optical transparency (being transparent from approximately ultraviolet to far infrared).

Figure 3:
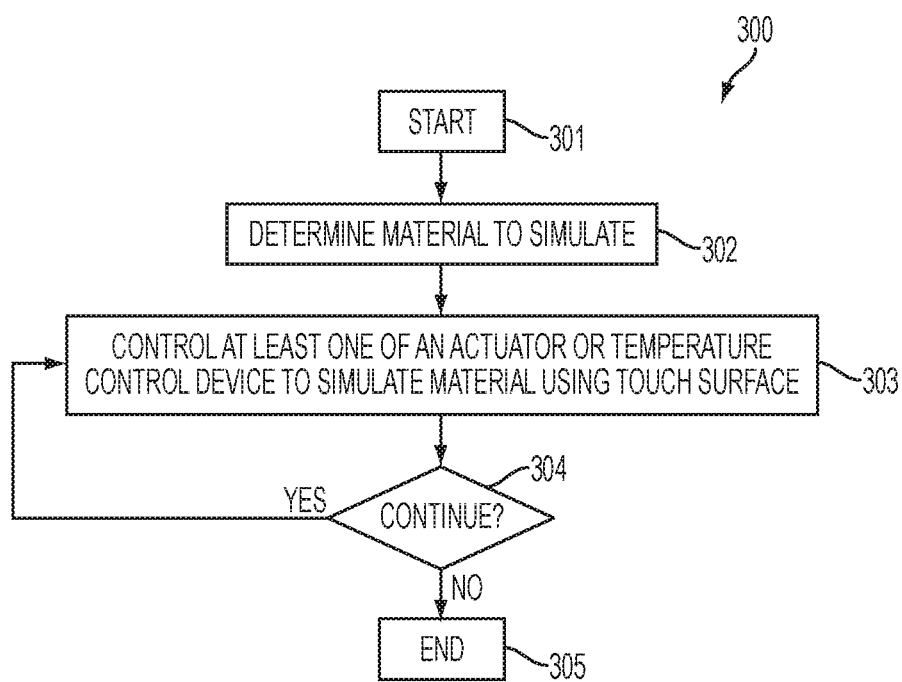
FIG. 3 is a flow chart illustrating a method for simulating materials using touch surfaces. This method may be performed by the system of FIG. 1A-1C or 2.

FIG. 3 is a flow chart illustrating a method 300 for simulating materials using touch surfaces. This method may be performed by the system 100 of FIGS. 1A-1C and/or 2.

The flow may begin at block 301 and proceed to block 302 where the control unit 109 determines a material to simulate. The flow then proceeds to block 303 where the control unit controls at least one of the actuator 106 or temperature control device 104 to simulate the material using a touch surface. The flow then proceeds to block 304.

At block 304, the control unit 109 determines whether or not to continue simulating the material using the touch surface. Such continuation may include updating the control based on one or more detected temperatures, one or more detected touches, the passage of time, one or more settings specifying how simulation is to be controlled, and so on.

If so, the flow returns to block 303 where the control unit continues to control at least one of the actuator or the temperature control device to continue simulating the material using the touch surface. Otherwise, the flow proceeds to block 305 and ends.

As discussed above and illustrated in the accompanying figures, the present disclosure discloses systems and methods for simulating materials using touch surfaces. A touch device may include at least one touch surface, at least one actuator or at least one temperature control device, and at least one control unit. The control unit may control the actuator or the temperature control device to cause at least a portion of the touch surface to simulate a material.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. A method of simulating a material using a touch-sensitive surface, comprising:
   locally controlling a temperature of a portion of the touch-sensitive surface using a temperature control device positioned directly beneath the touch-sensitive surface; and
   vibrating the portion of the touch-sensitive surface using one of a set of actuators that are positioned directly beneath the touch-sensitive surface in contact with the touch-sensitive surface; wherein a temperature and vibration of the portion of the touch-sensitive surface simulates a temperature and feel of the material.

2. The method of claim 1, further comprising compensating for heat produced by the one of the set of actuators.

3. The method of claim 1, wherein said locally controlling the temperature of the portion of the touch-sensitive and vibrating the portion of the touch-sensitive surface are performed in response to detection of a touch on the portion of the touch-sensitive surface.

4. The method of claim 1, further comprising measuring the temperature of the portion of the touch-sensitive surface prior to compensating for heat produced by the one of the set of actuators.

5. The method of claim 1, wherein said locally controlling the temperature of the portion of the touch-sensitive surface comprises:
   heating a first part of the portion of the touch-sensitive surface; and
   cooling a second part of the portion of the touch-sensitive surface.

6. The method of claim 1, further comprising compensating for heat produced by the one of the set of actuators using the temperature control device by dissipating or diffusing the heat.

7. The method of claim 1, further comprising vibrating an additional portion of the touch-sensitive surface differently than the portion of the touch-sensitive surface.

8. An electronic device, comprising:
   a touch-sensitive surface;
   a group of temperature control devices operably connected to, and positioned directly beneath, the touch-sensitive surface, each of the group of temperature control devices associated with different unique regions of the touch-sensitive surface;
   a group of actuators directly coupled to, and positioned directly beneath, the touch-sensitive surface; and
   a processing unit that simulates a material on a designated region of the touch-sensitive surface located above at least one of the group of temperature control devices and at least one of the group of actuators, the processing unit configured to execute instructions that:
controls a temperature of the designated region of the touch-sensitive surface using the at least one of the group of temperature control devices; and
vibrates the designated region of the touch-sensitive surface using at least one of the actuators that is located beneath the designated region.

9. The electronic device of claim 8, further comprising a temperature sensor coupled to the touch-sensitive surface that measures a temperature of the designated region of the touch-sensitive surface wherein the temperature sensor is coupled to a different surface of the touch-sensitive surface than the group of temperature control devices and the group of actuators.

10. The electronic device of claim 8, wherein the touch-sensitive surface comprises a capacitive touch screen.

11. The electronic device of claim 8, wherein the touch-sensitive surface comprises a capacitive trackpad.

12. The electronic device of claim 8, wherein the group of actuators includes a piezoelectric actuator.

13. The electronic device of claim 8, further comprising a touch sensor coupled to the touch-sensitive surface wherein the processing unit simulates the material on the designated region of the touch-sensitive surface based at least on data from the touch sensor regarding a touch to the designated region of the touch-sensitive surface.

14. The electronic device of claim 8, wherein the group of actuators includes an actuator that is operable to move horizontally with respect to the touch-sensitive surface.

15. An electronic device, comprising:
a touch-sensitive surface;
a group of temperature control devices that are each positioned directly below unique areas of the touch-sensitive surface;
a group of actuators that contact the touch-sensitive surface directly below the unique areas; and
a processing unit configured to execute instructions that simulate a material using a selected area of the touch-sensitive surface by:
controlling a temperature of the selected area of the touch surface using one of the group of temperature control devices;
vibrating the selected area of the touch-sensitive surface using one of the group of actuators.

16. The electronic device of claim 15, wherein the processing unit controls the temperature of the selected area of the touch-sensitive surface and vibrates the selected area of the touch-sensitive surface using a combined temperature control and actuator component.

17. The electronic device of claim 16, wherein the combined temperature control and actuator component comprises a temperature control component laminated to an actuator.

18. The electronic device of claim 15, wherein the processing unit is operable to simulate an additional material using an additional selected area of the touch-sensitive surface.

19. The electronic device of claim 18, wherein the processing unit is operable to simulate the additional material using the additional selected area of the touch-sensitive surface simultaneously with simulating the material using the selected area of the touch-sensitive surface.

20. The electronic device of claim 15, wherein the touch-sensitive surface is optically transparent approximately between ultraviolet and far infrared.

* * * * *